May 17, 1960 W. GOLLOS ET AL 2,936,525
MEASURING APPARATUS
Filed Aug. 3, 1956
FIG. I
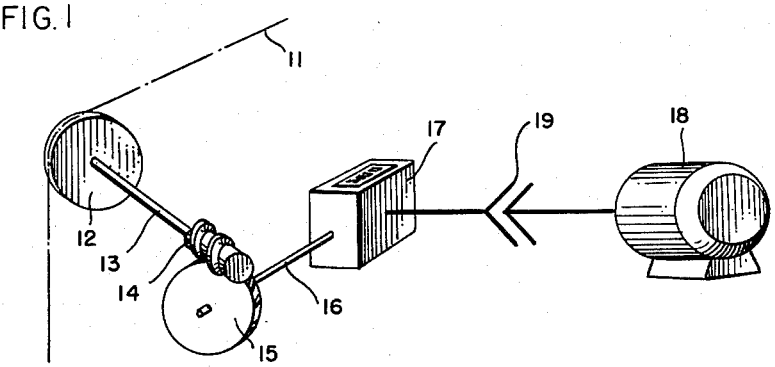
FIG. 2
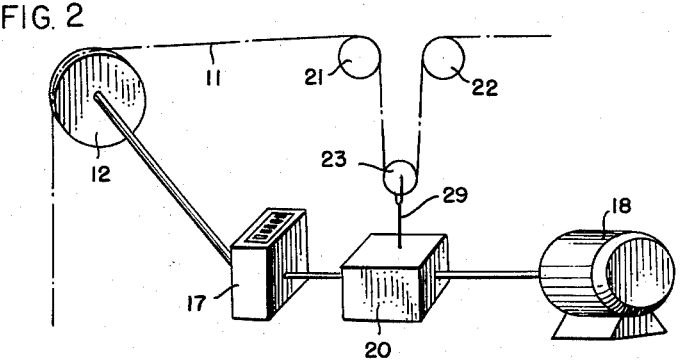
FIG. 3
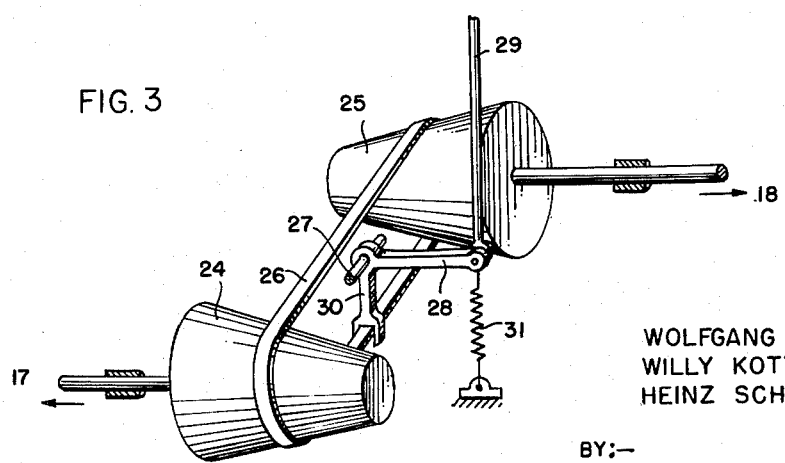
INVENTORS:—
WOLFGANG GOLLOS
WILLY KOTTE
HEINZ SCHIPPERS
BY:—
Marzall, Johnston, Cook & Root
ATT'YS

United States Patent Office 2,936,525
Patented May 17, 1960

2,936,525

MEASURING APPARATUS

Wolfgang Gollos, Kelsterbach (Main), Willy Kotte, Schippach, near Obernburg (Main), and Heinz Schippers, Remscheid-Lennep, Germany Application August 3, 1956, Serial No. 670,840

(Filed under Rule 47(a) and 35 U.S.C. 116)

Claims priority, application Germany August 3, 1955

8 Claims. (Cl. 33—134)

The present invention relates, in general, to the winding and reeling of flexible material, and has more particular reference to the winding of thread or like filamentary material upon spools, bobbins and similar filament receivers, the invention pertaining specifically to the provision of improved means for measuring the length of filament as delivered for winding upon a receiver.

It is conventional to measure the length of filament by delivering it around a measuring wheel or roller that is drivingly connected with a counting device adapted to register the number of revolutions made by the wheel around which the filament is delivered in order thus to measure the length of delivered filament in terms of counted revolutions of the measuring wheel. In such an arrangement, the filament operates to drive the counting device through the medium of the wheel. As a consequence, the filament is required to sustain the workload of the counting device. Furthermore, the rate of filament delivery around the measuring wheel may be subject to considerable variation. As a consequence, slippage of the thread with respect to the measuring wheel may, and frequently does, occur. This, together with variation of the tension at which the filament may be subjected may introduce substantial measuring errors, since filament slippage on the measuring roller as well as unevenly stretched filament will result in the incorrect operation of the counting device.

An important object of the present invention is to provide improved means for driving a counting device for measuring the length of a traveling filament which will indicate the true length of the measured filament despite variations in filament tension.

Another important object of this invention is to provide a measuring device of the character mentioned in which measuring errors due to filament slippage with respect to the measuring device are obviated.

Another important object is to provide filament length measuring means including a counting device, motive means for driving the counting device, and means controlled by filament movement with respect to the counting device for permitting the same to be driven by the motive means in accordance with the rate of filament movement with respect to the counting device.

Briefly stated, in accordance with one aspect of the invention, filament measuring means of the character mentioned, including counting mechanism, may be provided for operation in conjunction with a measuring wheel driven by the counting mechanism, means for delivering a filament to be measured to and around the wheel, means to drive the counting mechanism and measuring wheel at a variable rate of speed, and means operable to control said variable speed rate in accordance with the rate of delivery of the filament to the measuring wheel.

In accordance with another aspect of the invention, the length of a moving filament may be measured precisely by arranging a motor to drive a counting device through a slip clutch while permitting the counting device to function under the control of a measuring wheel around which the filament being measured is caused to travel, the measuring wheel being controllingly connected with the counting device through a worm and wheel which serves to allow the counting device to turn only in proportion to the length of filament delivered around the measuring wheel. As a consequence, the filament being measured is merely required to turn the measuring wheel, whereby the possibility of filament slippage with respect to the wheel is effectively inhibited, the power for driving the counting mechanism being supplied from a source of power other than the filament being measured.

The benefits of the present invention may also be realized by connecting a counting mechanism with a filament length measuring wheel, and by connecting the counting mechanism with a driving motor through a transmission adapted to progressively vary the rate of speed at which the counting mechanism and measuring wheel are driven, such arrangement including means for adjusting such transmission in accordance with the rate of filament delivery to the measuring wheel. In such an arrangement, the measuring wheel and the counting mechanism will at all times be driven at speed precisely corresponding with the rate of delivery of the filament around the measuring wheel thereby eliminating filament slippage with respect to the wheel and variations in filament tension as error inducing factors in the length measuring operation.

The foregoing and numerous other important objects, advantages and inherent functions of the invention will become apparent as the same is more fully understood from the following description which, taken in connection with the accompanying drawings, discloses preferred embodiments of the invention.

Referring to the drawings:

Fig. 1 is a somewhat diagrammatic perspective view of measuring apparatus embodying the present invention;

Fig. 2 is likewise a somewhat diagrammatic perspective view of alternate measuring apparatus embodying the invention; and Fig. 3 is a perspective view of a component of the apparatus shown in Fig. 2.

To illustrate the invention, the drawings show apparatus for measuring the length of a traveling thread or filament 11 while it is being delivered, for example, for winding as on a bobbin or reel, said thread being delivered around a measuring wheel or roller 12 on its way to the bobbin, to thereby turn the wheel in proportion to the length of filament passed around the wheel. The present invention contemplates the employment of a conventional counter 17 of any suitable or preferred construction with which the measuring wheel 12 is controllingly connected in order that the counter 17 may indicate the measured length of filament by registering the number of turns of the wheel 12 induced by the movement of the filament around the wheel. In accordance with the teachings of the present invention, the counter 17 is drivingly connected with any suitable or preferred motive means which may conveniently comprise an electric motor 18, so that the measuring wheel 12 is not required to supply the power needed to drive the counting mechanism, the wheel 12 serving only to cause the counter to operate in accordance with the length of filament delivered around the wheel.

To this end, as shown more particularly in Fig. 1, the driving motor 18 is drivingly connected with the counter 17 through a slip coupling 19 of any suitable preferred or convenient character, whereby the counter may normally be driven in non-positive fashion by the motor, but may be held in stationary condition at any time through slippage of the coupling 19 without discontinuing the operation of the motor 18. The counter 17, as shown in Fig. 1, may also be controllingly connected with the measuring wheel 12 by means of a shaft or axle 13 drivingly connected with the measuring wheel 12 and carrying a worm 14, the counter 17 being provided with a shaft 16 carrying a worm gear 15 is position drivingly engaged with the worm 14. As a consequence of the foregoing arrangement, the counter 17 will normally be held against turning movement by the locking action of the worm and gear, so long as the measuring wheel 12 remains stationary, such stationary condition of the counter being permitted by slippage of the coupling 19. Any turning movement of the measuring wheel 12, in response to the movement of the filament 11 around the wheel, will permit the counter to operate in precise proportion to the filament controlled rotation of the wheel 12. As a consequence, the counter will measure the length of filament delivered around the wheel without, however, subjecting the wheel and its driving filament to any counter driving load.

In place of motor 18, a normal belt or gear drive may be applied, which may derive its power from any suitable or preferred source, such as the winding axle of a takeup roller to which the filament may be delivered for winding, after passing the wheel 12. The slip coupling 19 may be constructed in any preferred fashion and may comprise an electric, magnetic or hydraulic coupling. It is, however, also possible to combine the motor 18 and slip coupling 19 as a single assembly constructed, for example, as a motor with a performance diagram strongly dependent upon motor speed. For such purpose an alternating-current short-circuit rotor motor, with increased rotor resistance, can be employed. Other driving devices, also, may be used for the purpose, as, for example, a Ferraris slip bushing motor.

As shown in Fig. 2 of the drawings, the counter 17 may be directly connected with the measuring wheel 12, while the motor 18 is drivingly connected with the counter through a variable drive transmission 20 adapted to progressively vary, in stepless fashion, the rate of speed at which the counter 17 is driven by the motor 18, means being provided for adjusting the transmission 20 in accordance with the rate of delivery of the filament 11 to the measuring wheel 12. As a consequence, the counter 17 and the measuring wheel 12 will at all times be driven at a speed which corresponds precisely with the rate at which the filament 11 is delivered around the measuring wheel 12, thus eliminating all possibility of error inducing relative slippage of the filament with respect to the measuring wheel 12.

To this end, as shown more particularly in Fig. 2, the filament 11 may be caused to pass around a pair of spaced apart guide rollers 21 and 22, and about a floating roller 23 which consequently is suspended in a bight formed by the filament 11 between the rollers 21 and 22. The transmission 20 may comprise a pair of spaced apart oppositely facing conical rollers 24 and drivingly interconnected by means of an endless belt 26. A bell crank lever pivoted as at 27 has an arm 28 suspendingly connected on the floating roller 23 as by means of a connecting link 29. The other arm 30 of the bell crank may be provided with a forked end for receiving one stretch of the endless belt 26 between the conical rollers 24 and 25 which are drivingly connected respectively with the counter 17 and the driving motor 18. If desired, a spring 31 may be connected to the link 29 in order to draw the floating roller 23 downwardly in the bight to maintain a desired tension in the filament 11.

If the amount of filament in the bight increases or decreases as the result of variation in the rate of filament delivery around the measuring wheel 12, the roller 23 will be shifted in one direction or the other thereby correspondingly rocking the bell crank lever to move the belt 26 on the rollers 24 and 25. Said rollers are arranged to drive the counter 17 and the measuring wheel 12 at a rate of speed to compensate for the variation in the delivery rate of the filament being measured.

It is thought that the invention and its numerous attendant advantages will be fully understood from the foregoing description, and it is obvious that numerous changes may be made in the form, construction and arrangement of the several parts without departing from the spirit and scope of the invention and without sacrificing any of its attendant advantages, the forms herein disclosed being preferred embodiments for the purpose of demonstrating the invention.

The invention is hereby claimed as follows:

1. Filament length measuring apparatus comprising a measuring wheel element for carrying a travelling filament to be measured and adapted for rotation in unison with the movement of the filament, a counting device for measuring the length of the filament in terms of the number of rotations of the wheel element, motive means including a motor element for turning the counting device, and mechanical coupling means interconnecting the counting device with one of said elements and operable in response to movement of the filament for controlling the operation of the counter in accordance with the length of filament delivered to and over the wheel.

2. Filament length measuring apparatus comprising a measuring wheel adapted to be turned in response to movement of the filament, a counting device for measuring the length of the filament in terms of the number of rotations of the wheel, motive means for driving the counting device, a slip coupling for connecting the motive means with the counting device, and means normally operable to hold the counting device against operating movement thereof when the measuring wheel is stationary and to permit movement of the counting device in accordance with the turning movement of the wheel.

3. Filament length measuring apparatus comprising a measuring wheel adapted to be driven by and in response to filament movement, a counting device for measuring the length of filament delivered over the wheel in terms of the number of revolutions made by the wheel, a motor, a slip clutch drivingly connecting the motor with the counting device, and means for controllingly connecting the wheel with the counting device comprising a worm drivingly connected with the wheel and a worm gear drivingly connected with said counting device and with said worm, whereby the counter is normally held against operating movement when the wheel is stationary and is permitted to turn under the driving influence of the motor in proportion to and as permitted by filament driven turning movement of the measuring wheel.

4. Filament length measuring apparatus comprising a measuring wheel for carrying a traveling filament to be measured, a counter adapted to measure filament length in terms of the number of rotations made by the wheel, motive means for driving the counter, said counter being also drivingly coupled with said wheel, a steplessly adjustable variable speed transmission mechanism drivingly coupling the motive means with the counter, and means for adjusting the transmission to regulate the driven speed of the counter and the measuring wheel in accordance with the rate at which the filament is delivered around the measuring wheel.

5. Filament length measuring apparatus comprising a measuring wheel for carrying a traveling filament to be measured, a counter for measuring the length of the filament in terms of the number of rotations made by the measuring wheel, motive means for driving the counter, steplessly adjustable variable speed transmission means drivingly interconnecting the motive means with the counter, sensing means for determining variations in the rate of filament delivery, and means controlled by said sensing means for adjusting the variable transmission means in accordance with such rate variation, whereby the driven rate of said counter and measuring wheel at all times corresponds with the rate of delivery of filament.

6. The method of measuring the length of a traveling filament which consists in drawing it upon and around a measuring wheel and turning the wheel in unison with filament movement around the wheel, while driving a counting device from a suitable source of driving power other than the filament and controlling the movement of the counting device in accordance with the traveling movement of the filament on the measuring wheel.

7. The method of measuring the length of a traveling filament which consists in applying the filament to turn a measuring wheel in unison with the movement of the filament, driving a counting device from a suitable source of driving power other than the filament, and connecting the measuring wheel with the counting device through a worm and gear to thereby normally hold the counting device stationary, by action of the worm and gear, while the wheel is stationary, and to permit the counting device to operate under the driving influence of said power source only to the extent allowed by rotation of the measuring wheel by the filament.

8. The method of measuring the length of a traveling filament which consists in turning a measuring wheel in unison with the movement of the filament, while driving a counting device through a variable speed transmission from a suitable source of driving power other than the filament, and continuously adjusting the transmission to match the speed at which the counting device and wheel are driven with the speed at which the filament is delivered to the measuring wheel.

References Cited in the file of this patent

UNITED STATES PATENTS

| | | |
|---|---|---|
| 423,786 | Loewenthal | Mar. 10, 1890 |
| 2,048,488 | Begun | July 21, 1936 |
| 2,064,467 | Evans | Dec. 15, 1936 |
| 2,115,737 | Menschner | May 3, 1938 |
| 2,783,540 | Berry | Mar. 5, 1957 |

FOREIGN PATENTS

| | | |
|---|---|---|
| 128,137 | Germany | Feb. 10, 1902 |
| 16,760 | Great Britain | Aug. 10, 1908 |

UNITED STATES PATENT OFFICE
CERTIFICATE OF CORRECTION

May 17, 1960

Patent No. 2,936,525

Wolfgang Gollos et al.

It is hereby certified that error appears in the above numbered patent requiring correction and that the said Letters Patent should read as corrected below.

In the grant, lines 1, 2 and 3, for "Wolfgang Gollos, of Kelsterbach (Main), Willy Kotte, of Schippach, near Obernburg (Main), and Heinz Schippers, of Remscheid-Lennep, Germany," read -- Wolfgang Gollos, of Kelsterbach (Main), Willy Kotte, of Schippach, near Obernburg (Main), and Heinz Schippers, of Remscheid-Lennep, Germany, said Gollos and said Schippers assignors to Vereinigte Glanzstoff-Fabriken A. G., of Wuppertal, Elberfeld, Germany, --; lines 12 and 13, for "Wolfgang Gollos, Willy Kotte, and Heinz Schippers, their heirs" read -- Willy Kotte, his heirs or assigns, and Vereinigte Glanzstoff-Fabriken A. G., its successors --; in the heading to the printed specification, lines 3, 4 and 5, for "Wolfgang Gollos, Kelsterbach (Main), Willy Kotte, Schippach, near Obernburg (Main), and Heinz Schippers, Remscheid-Lennep, Germany" read -- Wolfgang Gollos, Kelsterbach (Main), Willy Kotte, Schippach, near Obernburg (Main), and Heinz Schippers, Remscheid-Lennep, Germany, said Gollos and said Schippers assignors to Vereinigte Glanzstoff-Fabriken A. G., Wuppertal, Elberfeld, Germany --; column 3, line 59, for "rollers 24 and" read -- rollers 24 and 25 --.

Signed and sealed this 25th day of October 1960.

(SEAL)
Attest:

KARL H. AXLINE
Attesting Officer

ROBERT C. WATSON
Commissioner of Patents